(12) United States Patent
Padgett

(10) Patent No.: US 6,865,521 B1
(45) Date of Patent: Mar. 8, 2005

(54) METHOD FOR HORIZON BINNING FOR AN AREA OF INTEREST

(76) Inventor: Michael John Padgett, 3709 Graustark St., Houston, TX (US) 77006

(*) Notice: Subject to any disclaimer, the term of this patent is extended or adjusted under 35 U.S.C. 154(b) by 0 days.

(21) Appl. No.: 10/723,849

(22) Filed: Nov. 25, 2003

Related U.S. Application Data

(60) Provisional application No. 60/443,353, filed on Jan. 29, 2003.

(51) Int. Cl.[7] .......................... G06F 17/50; G06F 19/00
(52) U.S. Cl. ............................ 703/2; 702/13; 702/16; 367/68
(58) Field of Search .................. 703/2, 10; 367/15, 367/42, 31, 68, 83; 702/13, 16; 345/420, 428

(56) References Cited

U.S. PATENT DOCUMENTS

| | | | | |
|---|---|---|---|---|
| 5,430,689 A | * | 7/1995 | Rigsby et al. ................. | 367/15 |
| 5,583,825 A | * | 12/1996 | Carrazzone et al. .......... | 367/31 |
| 5,930,730 A | * | 7/1999 | Marfurt et al. ............... | 702/16 |
| 6,131,071 A | * | 10/2000 | Partyka et al. ................ | 702/16 |
| 6,292,754 B1 | * | 9/2001 | Thomsen ...................... | 702/14 |
| 6,463,387 B1 | * | 10/2002 | Runnestrand et al. ......... | 702/16 |
| RE38,229 E | * | 8/2003 | Marfurt et al. ............... | 702/16 |

* cited by examiner

Primary Examiner—Thai Phan
(74) Attorney, Agent, or Firm—Buskop Law Group, P.C.; Wendy Buskop (57) ABSTRACT

The method for horizon binning for an area of interest entails merging an attribute file with a second horizon file, identifying an area of interest of the merged file, identifying a time range for a time horizon file or a depth range for a depth horizon file, to perform the analysis, proposing a theory that the identified area has a portion contiguous between a hydrocarbon and water-bearing area, binning the identified area of interest using a file with time or depth values, computing a calculated value for each bin, creating a plot of the computed value versus the first value for each bin, viewing the plot to ascertain if a magnitude shift corresponds to a fluid contact, using discontinuity of the water and hydrocarbon reservoir models to confirm the theory, and using the discontinuity to determine a boundary between the water and hydrocarbon reservoir model and the corresponding water and hydrocarbon reservoirs for an identified area.

20 Claims, 4 Drawing Sheets

METHOD FOR HORIZON BINNING FOR AN AREA OF INTEREST

The present application claims priority to co-pending U.S. Provisional Patent Application Ser. No. 60/443,353 filed on Jan. 29, 2003.

FIELD

The present invention relates to the binning of oil and gas exploration and production scientific data for an are a of interest.

BACKGROUND

The goal of hydrocarbon exploration is to find porous and permeable geologic deposits containing high pore-space saturations of hydrocarbons, under sufficient pressure to allow so me mode of commercial production. In pursuit of this goal, companies, countries and individuals collect and process many types of geophysical and geological data. The data is often analyzed to find anomalous zones that can reasonably be attributed to the presence of hydrocarbons.

The usage of 2D and 3D seismic data anomalies has been a standard practice in the petroleum industry since the 1960s. Other geologic and geophysical data anomalies have been tried, sometimes successfully, for over a century. These include various gravimetric, electromagnetic, chem ical, biological and speculative methods.

The usage of anomalies for oil and gas detection has been plagued by several problems. First, most remote sensing anomalies (e.g., a 3D seismic amplitude anomaly) cannot be directly tied to a rock property that could be measured in the laboratory or using well logs. Much effort is expended attempting to tie observed anomalies to known rock responses by modeling the expected attribute response or otherwise correlating with a known producing reservoir. This work is often based on the experience of the practitioner.

A second problem is that the anomalies themselves are often evaluated or tied to response models in a qualitative manner. With qualitative assessment as the basis, quantitative, objective and reproducible error analysis has not been possible.

A third problem is that a basic physical property at work in hydrocarbon reservoirs is that both oil and gas are less dense than water. This generally causes oil and gas to accumulate up-structure in the pore-space of potential reservoir rocks. The higher water saturations are found, generally, down-structure. This separation of saturations is driven by gravity. When such a separation of fluid types occurs, flat interfaces, in depth, are expected to form.

This separation causes numerous possible classes of data attribute response. First, the hydrocarbon reservoir will have one response for each hydrocarbon type. The water-saturated part of the reservoir may have a second data response and the interfacial area a third type of attribute data response. This sequence of responses in the processed attribute data allows for a simultaneous analysis of the three classes.

Another problem is that the strength of many types of data attribute anomalies is dependent on the rock physics of the geologic systems. Some anomalies are very evident in the data. Others can be very subtle and cause considerable debate. Another associated problem is that much work in hydrocarbon exploration continues to be done in areas where the data are poor, noisy or difficult to interpret. In areas of good data quality, many high-strength anomalies are adequately interpreted by inspection. As the data quality and/or imaging ability of the data degrade, it can be very difficult to verify that a legitimate anomaly does or does not exist in a given set of data, especially when the rock physics suggests that any meaningful anomaly would be subtle.

The lack of quantification, error analysis, subjectivity of analysis and data quality issues cause variations in the appraisal of data anomalies in oil and gas exploration and production projects. It is not uncommon for different individuals or companies to examine the same anomaly and reach irreconcilably, different conclusions. In many cases, it has not been possible to explain quantitatively why the anomaly of one prospect should be "believed or trusted" more than that of another prospect. This causes different entities to make drastically different investment decisions concerning prospects based on the same underlying data.

The present invention is designed for the quantification and evaluation of data anomalies in the search for producible hydrocarbon deposits. It is designed to simultaneously quantify and summarize the hydrocarbon reservoir part of the anomaly, the water reservoir part of the data and the interfacial zone. The invention addresses the case of multiple hydrocarbon zones, e.g., gas over oil over water. It is designed to specifically test the model wherein gas is less dense than oil and oil is less dense than water, with data responses varying by structural position.

This current invention can also be used for the quantification of changes in lithology, facies, or rock fabric from one location to another. It is designed to function in areas of low signal-to-noise and aid in the determination of data suitability for hydrocarbon detection for the expected rock physics environment. This allows the invention to be applied to the detection of subtle hydrocarbon related data anomalies.

This invention is also designed to quantify responses and quantify response uncertainties in a manner that can be consistently defined, reported and replicated by others. Quantification and replication make the output of this invention suitable for quantitative comparison with rock physics analyses, petro-physical analyses, response modeling and geologic analyses (e.g., fit to structure analysis). This combination of capabilities represents an advance over current methods.

SUMMARY

The current method provides a method for horizon binning for an area of interest by merging an attribute file with a second horizon file. The method also entails identifying an area of interest of the merged file and identifying a time range for a time horizon file, or a depth range for a depth horizon file, over which to perform the analysis. The next step is proposing a theory that the identified area has a portion contiguous between a hydrocarbon and water-bearing area.

The method continues by binning the attribute data within the identified area of interest using a file with time or depth values and computing a calculated value for each time or depth bin. Next, the method entails creating a plot of the computed value versus the first value for each bin and viewing the plot to ascertain if a discontinuity corresponding to a fluid contact is evident. The method ends by using a magnitude shift in the attribute statistic of the water and hydrocarbon reservoir models to confirm the theory and using the magnitude shift to determine a boundary between the water and hydrocarbon reservoir model and the corresponding water and hydrocarbon reservoirs for an identified area.

BRIEF DESCRIPTION OF THE DRAWINGS

A specific embodiment of the method will be described by way of example with reference to the accompanying drawings, in which.

The present method is detailed below with reference to the listed Figures.

DETAILED DESCRIPTION OF THE PREFERRED EMBODIMENTS

Before explaining the present method in detail, it is to be understood that the method is not limited to the particular embodiments and that it can be practiced or carried out in various ways.

The present method was conceived to detect the changes in attribute response when moving from a water reservoir to a hydrocarbon reservoir to determine if exploration or production activities should continue in a given area. In addition, the method was conceived to operate in high noise, low signal to noise environments, where the data quality is poor. The method was designed to fully characterize the water reservoir inner and outer edges and the hydrocarbon inner and outer edges as well as interface between these reservoirs. Finally, the method was also conceived to determine the errors and uncertainties in all measurements and data attribute results relative to a given hydrocarbon reservoir and the corresponding water reservoir.

The preferred embodiment is a method for horizon binning for an area of interest. An area of interest means within the context of this patent application, a closed polygon, such as a shape with at least 3 sides, like a triangle, and more preferably a shape having up to N sides, for a positive integer N>2. The closed polygon may have more sides if the area of interest includes a group or a set of closed polygons or if more sides are needed to describe the region of under study.

The area of interest can also be the interior of the closed polygon or the union of the interiors of the set of closed polygons. Each closed polygon can be defined using geographic coordinates such as latitude-longitude, x-y prospect coordinate system, the x-y field development coordinate system and the internal 3-D seismic survey coordinates, such as line and trace numbers from a specific survey.

In addition, an area of interest can be either a geographic area for a hydrocarbon reservoir, an associated water reservoir, contiguous combinations of these or combinations of these with other reservoirs.

As a first step, an attribute file with attribute values is merged with a second file. An attribute file is defined as either a set of compiled seismic reflection data, such as 3-D data sets in an area considered to be for oil and gas production, which is then processed using a defined attribute generating algorithm, such as instantaneous amplitude, AVO slope, or RMS amplitude over a window. A particularly useful defined attribute is the background normalized root means squared (RMS) amplitude.

Once the defined attribute generating algorithm is used to process the set of compiled seismic reflection data, attribute data associated with a horizon of interest is extracted using the processed data. A horizon of interest is a geologic or geophysical surface in the earth that is considered a good prospect for oil and gas production. The horizon of interest can be defined by a time file that is a set of two way seismic time values depicting the seismic travel time from the datum to the horizon of interest and back to the datum.

The datum is the reference elevation from which travel times in a seismic dataset time file or interpretation is measured. Alternatively, the datum is the reference elevation from which depths for a horizon of interest are measured. The horizon of interest can be defined by a depth file that is a set of values that depict the depth from the datum to the horizon of interest, with increasing depth values toward the center of gravity of the Earth.

Another attribute file can be a set of compiled seismic velocity data processed using a defined attribute generating algorithm and extracted for or in conjunction with a horizon of interest. Still another attribute file usable in the method can be a set of geophysical gravity data extract, compiled or collected for a horizon of interest. Another usable attribute file can be a set of geophysical remote sensing data extracted for a horizon of interest, or a set of compiled or collected geologic measurements for a horizon of interest, such as fluid saturation within a reservoir formation. Two other attribute files that usable within this method would be a set of petro-physical measurements, such as resistively, for a horizon of interest, and a set of compiled or collected engineering data, such as initial production rate (IP) for a horizon of interest.

More specifically, the attribute file can be a set of compiled seismic reflection data, processed using a defined attribute generating algorithm and extracted for, in relation to or in conjunction with a horizon of interest or a set of compiled seismic velocity data processed using a defined attribute generating algorithm and extracted for or in conjunction with a horizon of interest. The attribute file can also be a set of geophysical gravity data extracted, compiled, or collected for a horizon of interest or a set of geophysical remote sensing data extracted or compiled for a horizon of interest. Finally, the attribute file can also be a set of petro-physical measurements for a horizon of interest, a set of compiled or collected engineering data for a horizon of interest, or any combination thereof.

The second file can be a time file with time values, such as the seismic travel time from and to a horizon of interest in a 3-D seismic data set. Alternatively, the second file can be a depth file with depth values, such as the depth from sea level to specific geologic formation within the Earth. By merging the attribute file with the second file, a merged file is formed. In one embodiment of the method, the merging of the two files is performed using geographic coordinates such as longitude-latitude, the x-y prospect coordinate system for an area undergoing hydrocarbon prospecting or development, the x-y prospect field development coordinate system of a field undergoing hydrocarbon prospecting or development, or 3-D seismic survey coordinates, such as line and trace numbers from a specific survey.

Next, an identified area of interest is formed from the merged file. In a preferred embodiment, the area of interest is the geographic intersection of the area of interest and the merged file. The geographic intersection is created by constructing file sets taken from the merged file whose members include, a geographic location G, an attribute at geographic location G, a horizon time or depth value at geographic location G where all such geographic locations G are within the area of interest.

As a next step in the method, a theory is proposed that has the identified area having at least a portion that is contiguous between a hydrocarbon reservoir and a water reservoir forming an interface.

The interface of the hydrocarbon reservoir with the water reservoir is proposed as the furthest extent of high hydrocarbon saturation in the down structure direction. The interface is a point of contact between dissimilar fluids within the pore space. A hydrocarbon reservoir can have a plurality of interfaces of hydrocarbon types, such as oil and gas, with a plurality of water reservoirs. It is contemplated that the hydrocarbon interface can be a plurality of layered hydrocarbon types.

The hydrocarbon reservoir interfaces with the water reservoir at the greatest extent of hydrocarbon saturation in a down structure direction or at a discontinuity in hydrocarbon saturation.

The theory also can include the hypothesis that the interface is located at a single depth, or at a depth corresponding to a single two way seismic travel time.

Binning is then performed on the identified area of interest. Binning usable in this method is contemplated as traditional numerical binning, with conventional data parameters, such as bin starting value, bin ending value, and increments thereof.

The identified area of interest is binned using a first value that is either a start time value or a start depth value, and then a second value that is either an end time value or an end depth value. Between the first value and second value binning, a plurality of bins are constructed using specified increments in either time or depth. An example of a specified increment could be, 100 feet of depth or 20 milliseconds of time. It is contemplated that the specified increments can range in feet from 1 to 500 feet and the specified increments in time can range from 1 to 100 milliseconds.

A calculated value for each bin is formed using any of the following:
  a. an average of attribute values within the bin;
  b. an average absolute value of the attribute values within the bin;
  c. a standard deviation for attribute values within the bin;
  d. a maximum of attribute values within the bin;
  e. a minimum of attribute values within the bin;
  f. a range of attribute values within the bin;
  g. a range of attribute absolute values within the bin;
  h. a median for attribute values within the bin;
  i. a mode for attribute values within the bin;
  j. a skewness for attribute values within the bin;
  k. a plurality of defined moments for attribute values within the bin; and
  l. combinations of these values noted above and the corresponding uncertainty of each for each bin.

Next, a diagram or plot is created of the above values by plotting the computed value relative to the first value, second value, or mid-point value for each formed bin.

The plot is then viewed to determine if a discontinuity or interface between a hydrocarbon reservoir and a water reservoir exists that depicts a fluid contact.

The interface is inferred by considering the area believed to be the water reservoir and the area believed to be the hydrocarbon reservoir. Then, the following query is made: "Are these two reservoirs distinguishable?". A second query is posed, "Is the change in magnitude from the water level to the hydrocarbon level consistent with the change expected from high water saturation to high hydrocarbon saturation, thereby confirming the hypothesized theory?". A third query posed, "Is the transition duration in time or depth from the water attribute magnitude level to the hydrocarbon attribute magnitude level consistent with the observed structural dip and expected reservoir thickness?".

Three outcomes occur with this method:
  a. the theory is confirmed that an interface is observed from a water reservoir to a hydrocarbon reservoir;
  b. no significant difference is found in the area proposed to be hydrocarbon with the area proposed to be water, thereby condemning the possibility of further exploration for hydrocarbons; and
  c. the data quality is poor or random such that no determination can be made from the presented data as to the existence or lack thereof of a hydrocarbon/water reservoir interface or of a water-to-hydrocarbon transition in attribute magnitude levels.

This method is particularly useful in areas where the signal to noise ratio in the data is particularly low, in situations where there is more noise than signal in the data.

The method is better understood with reference to the Figures.

Figure 1:
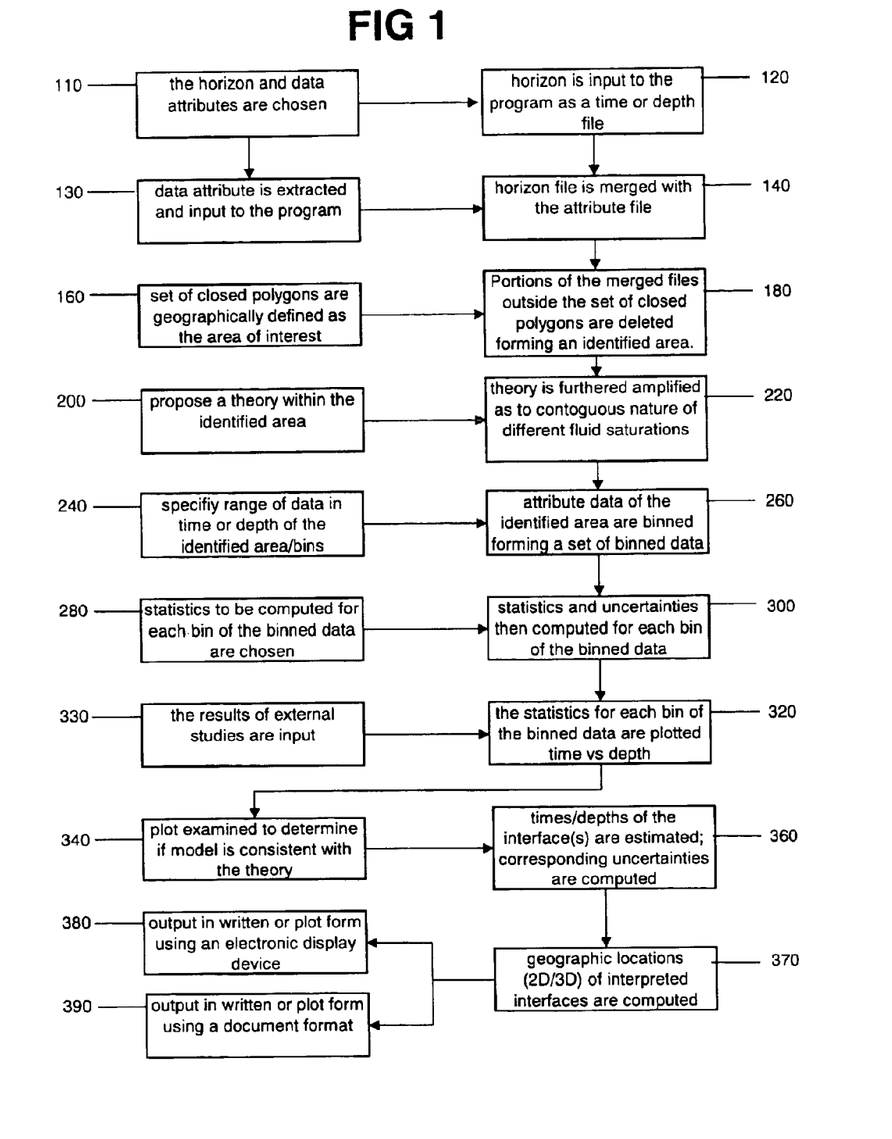
FIG. 1 is a diagram of the overall method.

FIG. 1 depicts the overall flow of the method. Initially, the horizon and data attributes are chosen (Step 110). The horizon is input to the program as a time file or as a depth file that is geographically indexed (Step 120) and the data attribute is extracted and input to the program as a geographically indexed file (Step 130). The horizon file is merged with the attribute file using geographic coordinates (Step 140). This step forms a file termed a merged file.

The next step, shown in FIG. 1, is that a closed polygon and/or a set of closed polygons are geographically defined as the area of interest (Step 160). Portions of the merged files not within the set of closed polygons are deleted (Step 180) thereby generating an identified area.

Next, a theory is proposed that within the identified area (Step 200) exists a fluid interface caused by hydrocarbons above water or lighter hydrocarbons above denser hydrocarbons.

The existence of a flat fluid contact separating portions of the reservoir having different pore fluid saturations is theorized as the cause of the data attribute anomaly change from lower to upper structural positions. The theory is further extended to propose that the identified area contains some portion wherein different fluid saturations are contiguous (Step 220).

Next, (i) a range of data in time or depth of the identified area and (ii) the sequence of bins for the identified area are specified (Step 240).

The attribute data of the identified area are binned forming a set of binned data (Step 260). Each bin is identified by the time or depth range of the values of the identified area within the bin. The statistics to be computed for each bin of the binned data are chosen (Step 280).

The statistics and the uncertainties for each statistic are then computed for each bin of the binned data (Step 300).

Next, the statistics for each bin of the binned data are plotted, or otherwise displayed, with the uncertainties as a function of bin-center time or depth (Step 320). Alternatively. The statistics can be presented as a function of the bin edge in time or depth.

As an optional step, the results of external studies, modeling the geological attribute response, geophysical attribute response or engineering attribute response of the theorized system, are input to the process (Step 330). In this case, the theorized and modeled system should address the geologic, rock physics, pore saturation, data acquisition, data processing and data presentation elements of the process as it applies to the identified area at the horizon of interest.

The statistics and uncertainties for all bins are examined to determine if they and any input model results are consistent with the theory of the existence of at least one interface separating regions of different pore fluid saturation for fluids of differing densities (Step 340). This examination step also determines if the up-structure bin statistics and uncertainties are consistent with at least one hydrocarbon response and whether the down-structure bin statistics and uncertainties are consistent with a high water saturation response or a heavier hydrocarbon response. The range of times or depths (for an input time file or input depth file, respectively) of the at least one interface is estimated and corresponding uncertainties are computed (Step 360).

The geographic location (in two dimension (2D) and three dimension (3D)) of interpreted interfaces are then computed using the range of locations and uncertainties of the inferred interfaces and the horizon of interest within the identified area (Step 370).

Finally, the final output results are written, plotted in map form, and/or displayed in a 3D visualization format using an electronic display device (Step 380) and the final output results are written, plotted in map form and/or displayed in a 3D visualization format in a document format (Step 390).

Figure 2:
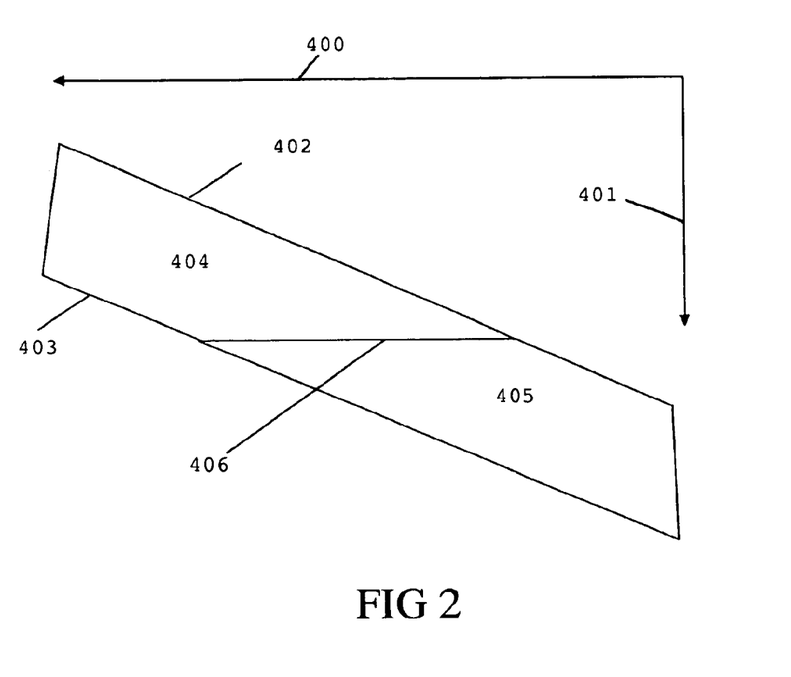
FIG. 2 depicts the hydrocarbon reservoir interface with a water reservoir.

FIG. 2 shows the geometry of a hydrocarbon reservoir 404, a water reservoir 405 and the interface 406 between the hydrocarbon reservoir and the water reservoir. It is also possible that 405 can be a heavier hydrocarbon reservoir as compared with hydrocarbon reservoir 404. The datum surface 400 is the datum from that all depths and times are measured. Element 401 indicates the direction of increasing depth and/or increasing seismic travel time as measured from the datum surface 400.

The surface 402 gives the bounds the hydrocarbon/water reservoirs. The bottom 403 gives the lower bounds of the hydrocarbon/water reservoirs. Either the top surface 402 or the bottom surface 403 may serve as a typical horizon of interest. The horizon of interest may be any surface defined to be as surface expressible as a one-to-one function of either (or both) the top surface 402 or the bottom surface 403.

The geologic region of proposed high water saturation and minimal or no productive hydrocarbon saturation 405 is also shown in FIG. 2. The interface 406 divides the two geological regions, 404 and 405. The interface 406 is normally expected to be flat with respect to the depth or time axis 401.

Figure 3:
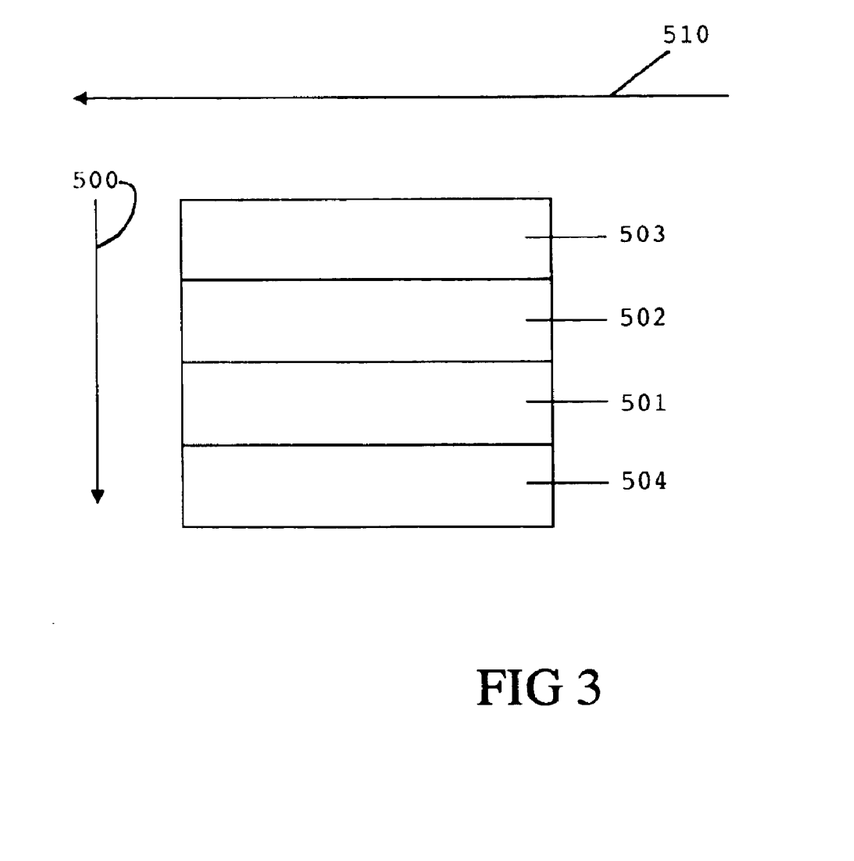
FIG. 3 depicts interfaces formed with a plurality of hydrocarbon types.

FIG. 3 depicts the interface as a plurality of hydrocarbon reservoir types and water reservoirs separated by interfaces. The interface is shown with respect to an axis indicating the direction of increasing depth and/or increasing seismic travel time 500 from a datum 510. The bottom layer 504 is predominately a water reservoir containing a high water saturation and minimal or no productive hydrocarbon saturation. The layer 501 is a hydrocarbon reservoir containing a high hydrocarbon saturation of a type that is less dense than the saturating fluid(s) in the layer below, 504.

The layer 502 is another hydrocarbon reservoir containing a high hydrocarbon saturation of a type that is less dense than the saturating fluid(s) in the layer 501. The top layer 503 is a hydrocarbon reservoir containing a high hydrocarbon saturation of a type that is less dense than the saturating fluid(s) in the layer 502. FIG. 3 is only one embodiment, and various reservoirs can form specific layers of the form shown as 503, 502, 501, and 504.

Figure 4:
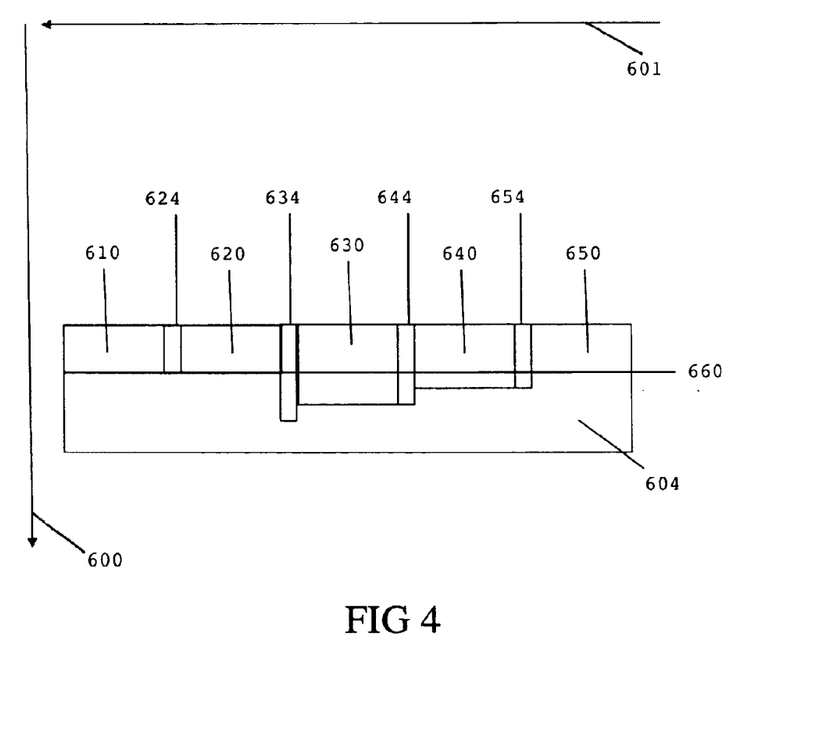
FIG. 4 depicts the interface along the water reservoir as alternating between hydrocarbon types.

FIG. 4 depicts the interface between a plurality of hydrocarbon saturation types along the water reservoir, separated by permeability barriers or other barriers to fluid exchange. The interface is shown with respect to an axis indicating the direction of increasing depth and/or increasing seismic travel time 600 from a datum 601. The bottom reservoir 604 contains a high water saturation and minimal or no productive hydrocarbon saturation. Reservoirs, 610, 620, 630, 640, and 650, above the bottom reservoir 604 contain high hydrocarbon saturation of types less dense than the saturating fluid(s) found in the bottom reservoir 604. Layer 660 is an interface.

Reservoirs, 610, 620, 630, 640, and 650, are shown as isolated from one another by permeability barriers or other barriers to flow.

In FIG. 4, the impermeable layers are shown as elements 624, 634, 644, and 654. These impermeable layers can be faults, gouge materials, facies changes or similar geologic elements. Again, FIG. 4 is only one embodiment. Various other elements can form each specific layer, 604, 610, 620, 630, 640, and 650.

In discussing this method, several terms require consistent definition. The water reservoir is a geologic rock formation having both porosity and permeability and saturated primarily by water. The water formation may contain a partial hydrocarbon saturation, but at a sufficiently low level so as to preclude economic development.

Similarly, the hydrocarbon reservoir is a geologic rock formation having both porosity and permeability and saturated in most cases by a combination of water and hydrocarbons. The saturation of hydrocarbons must be sufficiently high so as to allow economic development. If the saturation of hydrocarbons does not allow the production of hydrocarbons and associated water in quantities that are commercial, the reservoir would not be called a hydrocarbon reservoir. Typically, the hydrocarbon reservoir is found up-structure of the water reservoir, which is located down-structure. In this discussion, up-structure refers to shallower depths from the surface within the earth. Down-structure refers to deeper depths within the earth. In the case of seismic travel times, deeper depths correspond to larger absolute value seismic travel times and shallower depths to smaller absolute value travel times.

Both depths and seismic travel times are typically measured from a specified datum. The datum is a specified surface to which measurements are referenced. The term deeper means increasing depth values from the datum toward the center of gravity of the Earth. Seismic two way travel times will typically increase for reflections from geologic units in the general direction of the center of gravity of the Earth from the datum. For example, in offshore exploration and production, the datum is typically taken to be mean sea level. Depths or seismic times are then referenced to mean sea level as the datum and increase, indicating deeper, in a direction toward the center of gravity of the Earth. In this discussion, the difference between the center of gravity of the Earth and the centroid center of the Earth is considered negligible.

While this method has been described with emphasis on the preferred embodiments, it should be understood that within the scope of the appended claims, the method might be practiced other than as specifically described herein.

What is claimed is:

1. A method for horizon binning for an area of interest comprising:
   a. identifying an attribute file derived from a member of the group consisting of:
      i. a set of compiled seismic reflection data, processed using a defined attribute generating algorithm and extracted for a horizon of interest;
      ii. a set of compiled seismic reflection data processed using a defined attribute generating algorithm in conjunction with a horizon of interest;
      iii. a set of compiled seismic velocity data processed using a defined attribute generating algorithm and extracted for a horizon of interest;

iv. a set of compiled seismic velocity data processed using a defined attribute generating algorithm in conjunction with a horizon of interest;
v. a set of geophysical gravity data extracted for a horizon of interest;
vi. a set of geophysical gravity data compiled for a horizon of interest;
vii. a set of geophysical gravity data collected for a horizon of interest;
viii. a set of geophysical remote sensing data extracted for a horizon of interest;
ix. a set of geophysical remote sensing data compiled for a horizon of interest;
x. a set of geophysical gravity data collected for a horizon of interest;
xi. a set of compiled geologic measurements for a horizon of interest;
xii. a set of collected geologic measurements for a horizon of interest; and
xiii. combinations thereof;

b. merging the attribute file with attribute values with a second horizon file, wherein the second horizon file is a member of the group consisting of a time file with time values and a depth file with depth values, wherein merging the attribute file with the second horizon file forms a merged file;
c. identifying an area of interest of the merged file forming an identified area file;
d. identifying a time range for a time horizon file or a depth range for a depth horizon file over which to perform analyses on the identified area file;
e. proposing a theory that the identified area has at least a portion that is contiguous between a hydrocarbon area and a water-bearing area;
f. binning the identified area of interest using a member of the group consisting of file with a first value, wherein the first value is a member of the group consisting of time values and depth values, wherein binning the merged file with the first value forms a plurality of bins in specified increments;
g. computing a calculated value for each bin forming a computed value, for at least one member of the group consisting of
  i. an average of attribute values within the bin;
  ii. average absolute value of the attribute values within the bin;
  iii. a standard deviation for the attribute values within the bin;
  iv. a maximum of the attribute value within the bin;
  v. a minimum of the attribute value within the bin;
  vi. a range of attribute values within the bin;
  vii. a range of attribute absolute values within the bin;
  viii. a median for the attribute value within the bin;
  ix. a mode for the attribute values within the bin;
  x. a skewness for the attribute values within the bin;
  xi. a plurality of defined moments for attribute values within the bin; and
  xii. combinations thereof;
h. creating a plot by plotting the computed value relative to the first value for each bin;
i. viewing the plot to ascertain if a discontinuity would correspond to a fluid contact;
j. using a discontinuity with a water reservoir model and at least one hydrocarbon reservoir model to confirm the theory; and
k. using the discontinuity to determine a boundary between the water reservoir model and the hydrocarbon reservoir model and the corresponding water reservoir and the corresponding hydrocarbon reservoir for an identified area.

2. The method of claim 1, wherein the merging of the attribute file and the second horizon file is performed using geographic coordinates comprising:
  a. X-Y prospect coordinate system;
  b. X-Y field development system;
  c. latitude and longitude;
  d. internal 3D seismic survey coordinates; and
  e. combinations thereof.

3. The method of claim 1, wherein the area of interest is identified using coordinates of a set of closed polygons.

4. The method of claim 3, wherein the area of interest is the interior of the closed polygon.

5. The method of claim 4, wherein the area of interest is the union of the interiors of the closed polygons.

6. The method of claim 5, wherein the closed polygon is defined using geographic coordinates comprising:
  a. X-Y prospect coordinate system;
  b. X-Y field development system;
  c. latitude and longitude;
  d. internal 3D seismic survey coordinates; and
  e. combinations thereof.

7. The method of claim 3, wherein the closed polygon is defined using geographic coordinates comprising:
  a. X-Y prospect coordinate system;
  b. X-Y field development system;
  c. latitude and longitude;
  d. internal 3D seismic survey coordinates; and
  e. combinations thereof.

8. The method of claim 1, wherein the area of interest is identified using a set of closed polygons.

9. The method of claim 1, wherein the identified area of interest is the geographic intersection of the area of interest and the merged file.

10. The method of claim 9, wherein the geographic intersection is created by constructing a field of sets taken from the merged file,
  a. wherein the field of sets comprise a geographical location G, attribute at geographical location G, horizon time value at geographic location G, and horizon depth value at geographic location G; and
  b. further, wherein all such geographic locations G are within the area of interest.

11. The method of claim 1, wherein the time horizon file is a set of two-way seismic time values depicting the seismic travel time from the datum to the horizon of interest and back to a datum.

12. The method of claim 11, wherein the datum is the reference elevation from which travel times in a seismic dataset time file is measured.

13. The method of claim 1, wherein the depth horizon file is a set of values that depict the depth from a datum to the horizon of interest.

14. The method of claim 13, wherein the datum is the reference elevation from which depths for a horizon of interest are measured.

15. The method of claim 1, wherein the area of interest is selected from the group consisting of a geographic area for a hydrocarbon reservoir, a geographic area for a water reservoir, a contiguous hydrocarbon and water reservoir, and combinations thereof.

16. The method of claim 1, wherein the specified increments range from about 1 foot to about 500 feet.

17. The method of claim 1, wherein the specified increments range from about 1 millisecond to about 100 milliseconds.

18. The method of claim 1, wherein the hydrocarbon reservoir interfaces with the water reservoir at the greatest extent of hydrocarbon saturation in a down structure direction.

19. The method of claim 1, wherein the hydrocarbon reservoir interfaces with the water reservoir at a discontinuity in hydrocarbon saturation.

20. The method of claim 1, wherein the proposed theory recites that an interface is located at a position comprising:

a. a single depth;
b. a single two way seismic travel time; and
c. combinations thereof.

* * * * *